US012783868B2

(12) United States Patent
Fukuda et al.

(10) Patent No.: US 12,783,868 B2
(45) Date of Patent: Nov. 3, 2026

(54) GLOBAL NEURAL TRANSDUCER MODELS LEVERAGING SUB-TASK NETWORKS

(71) Applicant: INTERNATIONAL BUSINESS MACHINES CORPORATION, Armonk, NY (US)

(72) Inventors: Takashi Fukuda, Tokyo (JP); Samuel Thomas, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1196 days.

(21) Appl. No.: 17/526,350

(22) Filed: Nov. 15, 2021

(65) Prior Publication Data

US 2023/0153601 A1 May 18, 2023

(51) Int. Cl.
*G06N 3/08* (2023.01)
*G06N 3/045* (2023.01)
*G10L 15/00* (2013.01)

(52) U.S. Cl.
CPC ............... *G06N 3/08* (2013.01); *G06N 3/045* (2023.01); *G10L 15/00* (2013.01)

(58) Field of Classification Search
CPC ........... G06N 3/08; G06N 3/045; G10L 15/00
See application file for complete search history.

(56) References Cited

U.S. PATENT DOCUMENTS

| | | | | |
|---|---|---|---|---|
| 11,645,509 | B2 * | 5/2023 | Zhou | G06N 3/0464 706/14 |
| 2018/0047389 | A1 | 2/2018 | Song et al. | |
| 2019/0087193 | A1 | 3/2019 | Brar et al. | |
| 2019/0272553 | A1 | 9/2019 | Saini et al. | |
| 2020/0251118 | A1 | 8/2020 | Sunkavally et al. | |
| 2020/0410355 | A1 * | 12/2020 | Zhu | G06F 18/21345 |
| 2021/0073628 | A1 | 3/2021 | Kie et al. | |
| 2021/0304769 | A1 * | 9/2021 | Ye | G10L 15/26 |

(Continued)

FOREIGN PATENT DOCUMENTS

| | | | |
|---|---|---|---|
| CN | 110930982 | A | 3/2020 |
| CN | 111816162 | A | 10/2020 |

OTHER PUBLICATIONS

Joshi et al., Transfer Learning Approaches for Streaming End-to-End Speech Recognition System, Aug. 17, 2020 (Year: 2020).*

(Continued)

*Primary Examiner* — Tewodros E Mengistu
(74) *Attorney, Agent, or Firm* — CHIP LAW GROUP

(57) ABSTRACT

A computer-implemented method for training a neural transducer for speech recognition is provided. The method includes initializing the neural transducer having a prediction network and an encoder network and a joint network. The method further includes expanding the prediction network by changing the prediction network to a plurality of prediction-net branches. Each of the prediction-net branches is a prediction network for a respective specific sub-task from among a plurality of specific sub-tasks. The method also includes training, by a hardware processor, an entirety (Continued)

of the neural transducer by using training data sets for all of the plurality of specific sub-tasks. The method additionally includes obtaining a trained neural transducer by fusing the plurality of prediction-net branches.

13 Claims, 6 Drawing Sheets

(56) References Cited

U.S. PATENT DOCUMENTS

| | | | | |
|---|---|---|---|---|
| 2021/0374565 | A1 | 12/2021 | Katz et al. | |
| 2022/0262356 | A1 * | 8/2022 | Ogawa | G10L 15/197 |
| 2024/0265924 | A1 * | 8/2024 | Li | G10L 15/063 |

OTHER PUBLICATIONS

Suchin Gururangany, DEMIX Layers: Disentangling Domains for Modular Language Modeling, Arxiv, Aug. 20, 2021. (Year: 2021).*

Yang et al. "Multi-Task Language Modeling for Improving Speech Recognition of Rare words" (Year: 2021).*

Yoo, Sanghyun, et al. "A highly adaptive acoustic model for accurate multi-dialect speech recognition", InICASSP 2019-2019 IEEE International Conference on Acoustics, Speech and Signal Processing (ICASSP). May 12, 2019, pp. 5716-5720.

Li, Bo, et al. "Multi-dialect speech recognition with a single sequence-to-sequence model", In2018 IEEE international conference on acoustics, speech and signal processing (ICASSP). Apr. 15, 2018, pp. 4749-4753.

Saon, George, et al. Advancing RNN transducer technology for speech recognition. InICASSP 2021-2021 IEEE International Conference on Acoustics, Speech and Signal Processing (ICASSP). Mar. 17, 2021, pp. 5654-5658 IEEE.

Li, Jinyu, et al. "Improving RNN transducer modeling for end-to-end speech recognition", In2019 IEEE Automatic Speech Recognition and Understanding Workshop (ASRU). Sep. 26, 2019, pp. 114-121.

Yang, Xuesong, et al. "Joint modeling of accents and acoustics for multi-accent speech recognition", In2018 IEEE International Conference on Acoustics, Speech and Signal Processing (ICASSP). Feb. 7, 2018, pp. 1-5.

International Search Report from PCT/CN2022/118946 dated Dec. 5, 2022. (9 pages).

* cited by examiner

GLOBAL NEURAL TRANSDUCER MODELS LEVERAGING SUB-TASK NETWORKS

BACKGROUND

The present invention generally relates to artificial intelligence, and more particularly to global neural transducer models leveraging sub-task networks.

Next generation RNN-T based speech recognition has been actively researched/developed for speech-to-text (STT) service.

In the present circumstances, RNN-T models that are specific to each language are constructed separately.

For each language, several separate models are often created to achieve a sufficient performance. As an example, given the various dialects (accents) of English spoken by large demographics across various English-speaking countries, American English (US), Australian English (AU), and British English (UK) models are currently deployed as individual language specific STT services. From a usability and maintenance cost viewpoint, a more efficient approach is needed.

SUMMARY

According to aspects of the present invention, a computer-implemented method for training a neural transducer for speech recognition is provided. The method includes initializing the neural transducer having a prediction network and an encoder network and a joint network. The method further includes expanding the prediction network by changing the prediction network to a plurality of prediction-net branches. Each of the prediction-net branches is a prediction network for a respective specific sub-task from among a plurality of specific sub-tasks. The method also includes training, by a hardware processor, an entirety of the neural transducer by using training data sets for all of the plurality of specific sub-tasks. The method additionally includes obtaining a trained neural transducer by fusing the plurality of prediction-net branches.

According to other aspects of the present invention, a computer program product for training a neural transducer for speech recognition is provided. The computer program product includes a non-transitory computer readable storage medium having program instructions embodied therewith. The program instructions are executable by a computer to cause the computer to perform a method. The method includes initializing, by a hardware processor, the neural transducer having a prediction network and an encoder network and a joint network. The method further includes expanding, by the hardware processor, the prediction network by changing the prediction network to a plurality of prediction-net branches. Each of the prediction-net branches is a prediction network for a respective specific sub-task from among a plurality of specific sub-tasks. The method also includes training, by the hardware processor, an entirety of the neural transducer by using training data sets for all of the plurality of specific sub-tasks. The method additionally includes obtaining, by the hardware processor, a trained neural transducer by fusing the plurality of prediction-net branches.

According to yet other aspects of the present invention, a computer processing system for training a neural transducer for speech recognition is provided. The system includes a memory device for storing program code. The system further includes a hardware processor operatively coupled to the memory device for running the program code to initialize the neural transducer having a prediction network and an encoder network and a joint network. The hardware processor further runs the program code to expand the prediction network by changing the prediction network to a plurality of prediction-net branches. Each of the prediction-net branches is a prediction network for a respective specific sub-task from among a plurality of specific sub-tasks. The hardware processor also runs the program code to train an entirety of the neural transducer by using training data sets for all of the plurality of specific sub-tasks. The hardware processor additionally runs the program code to obtain a trained neural transducer by fusing the plurality of prediction-net branches.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to global neural transducer models leveraging sub-task networks. While the present invention is primarily described with respect to recurrent neural network transducers (RNN-Ts), the present invention can be applied to any neural transducer, as readily appreciated by one of ordinary skill in the art, given the teachings of the present invention provided herein.

In embodiments of the present invention, a single unified English model (called global English model (GEM)) is provided that processes multiple English dialects with a single model.

In embodiments of the present invention, a method is provided to construct an accurate GEM based on dialect-dependent multi-branch networks with a novel integration between prediction and encoder networks.

In an embodiment, the present invention involves initializing a network with a pretrained model (or a random initialization), expanding the prediction network with the base branch by copying weights, training an entire network, and then fusing the prediction networks into a single branch. In an embodiment, training the entire network is performed on weighted integration between multi-prediction networks and an encoder network at a joint layer.

Figure 1:
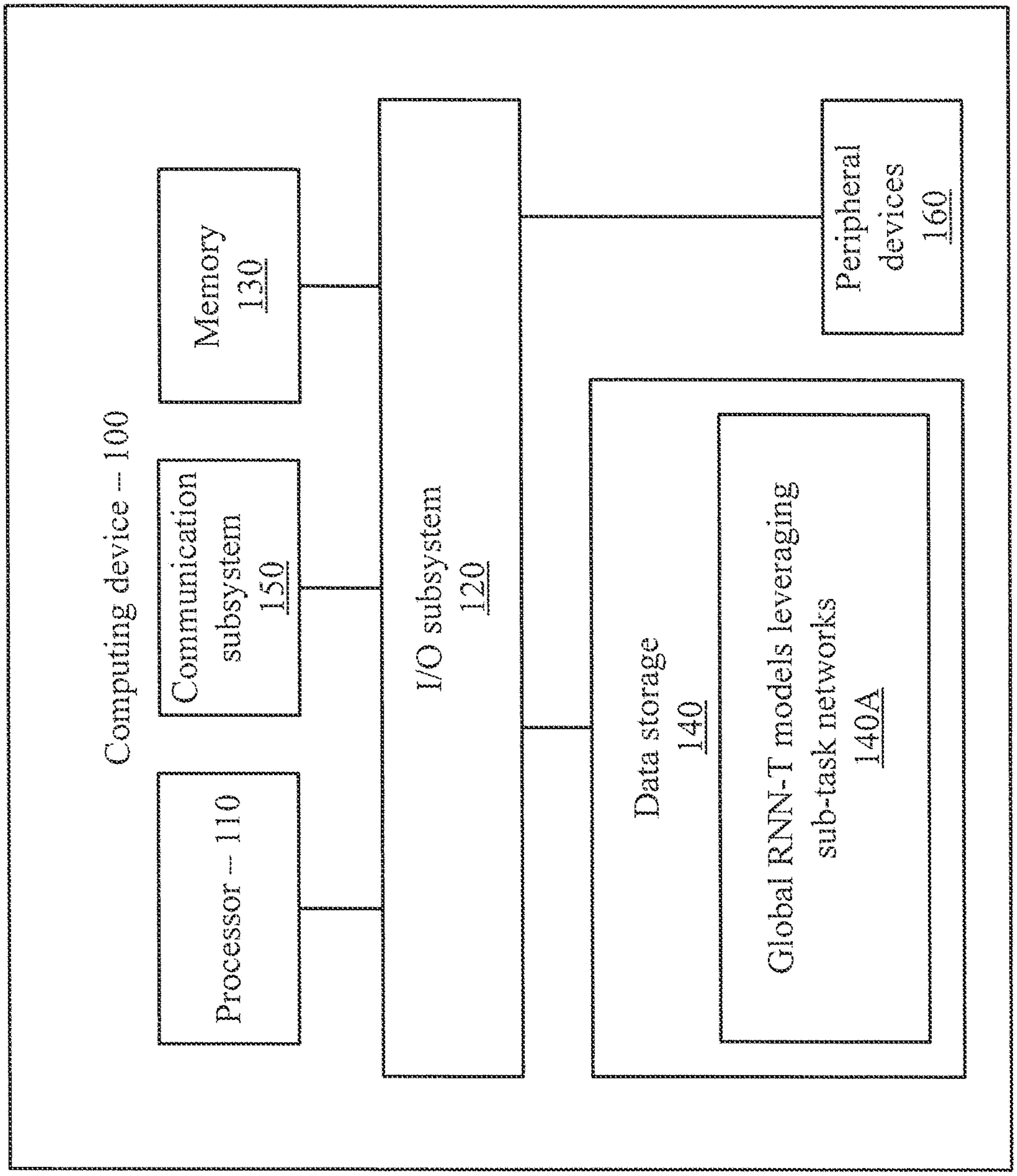
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to provide global RNN-T models leveraging sub-task networks.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for global RNN-T models leveraging sub-task networks. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
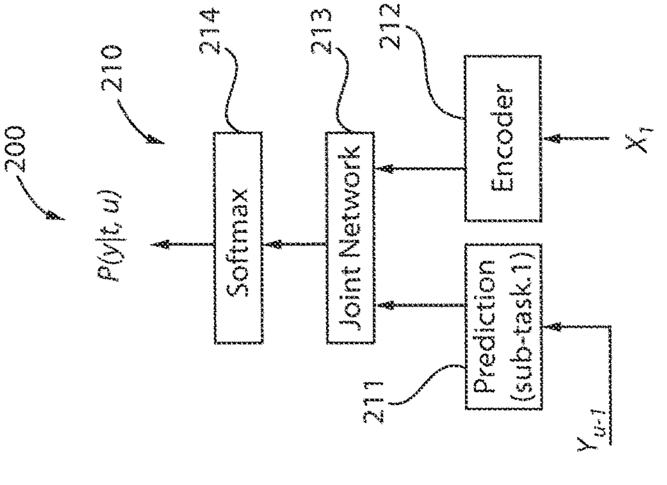
FIG. 2 is a block diagram showing an exemplary entire network initialization, in accordance with an embodiment of the present invention.

These and other variations of a hardware processor subsystem are also contemplated in accordance with embodiments of the present invention FIG. 2 is a block diagram showing an exemplary entire network initialization 200, in accordance with an embodiment of the present invention.

The network initialization 200 involves a network 210. The network 210 includes a prediction network 211, an encoder network 212, a joint network 213, and a softmax block 214. The network 210 is pretrained with a single-dialect network or a random initialization.

The prediction network 211, corresponding to a sub-task 1, receives $y_{u-1}$ and outputs $$h_u^{dec}.$$

The encoder network 212 receives $x_t$ and outputs $$h_u^{enc}.$$

The joint network 213 receives $$h_u^{dec} \text{ and } h_u^{enc}$$

and outputs $z_{t,u}$.

The softmax layer 214 receives $z_{t,u}$ and outputs P(y|t,u).

Figure 3:
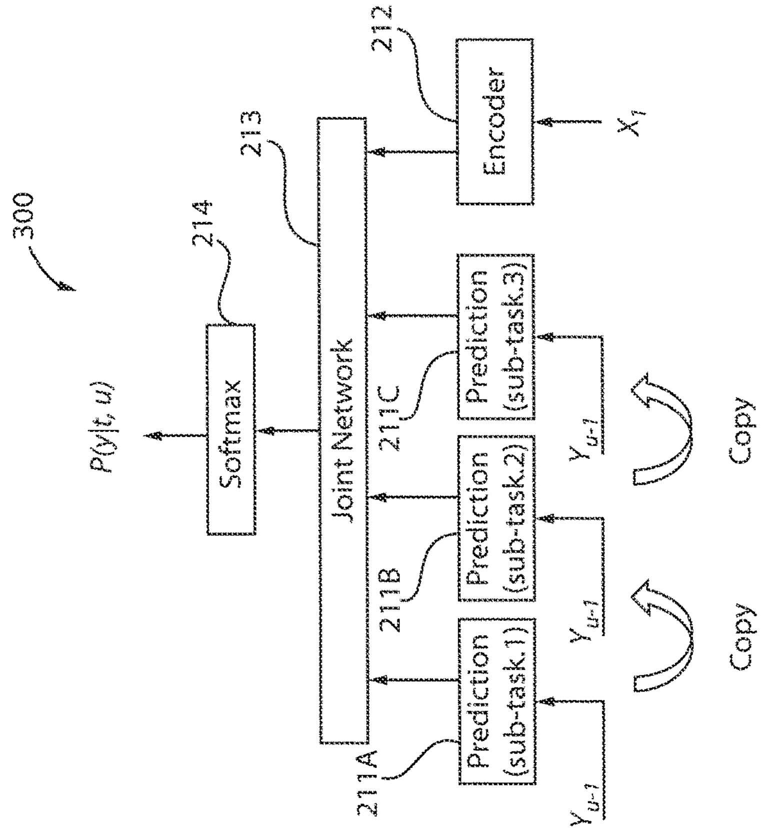
FIG. 3 is a block diagram showing an exemplary prediction network expansion, in accordance with an embodiment of the present invention.

FIG. 3 is a block diagram showing an exemplary prediction network expansion 300, in accordance with an embodiment of the present invention.

The prediction network 211 is expanded to include prediction networks 211A, 211B, and 211C to provide an expanded network 310.

While prediction network 211 in FIG. 2 is directed to sub-task 1, prediction network 211A is now directed to sub-task 1, with prediction network 211B directed to sub-task 2, and with prediction network 211C directed to sub-task 3. The additional prediction networks 211B and 211C can be provided using a copying approach from the prediction network 211 directed to sub-task 1.

An entirety of the expanded network 310 is then trained.

The prediction network 211A, corresponding to a sub-task 1, receives $y_{u-1,\ st1}$, $y_{u-1,\ st2}$, and $y_{u-1,\ st3}$ and outputs $$h_u^{dec,st1}.$$

The prediction network 211B, corresponding to a sub-task 2, receives $y_{u-1,\ st1}$, $y_{u-1,\ st2}$, and $y_{u-1,\ st3}$ and outputs $$h_u^{dec,st2}.$$

The prediction network 211C, corresponding to a sub-task 3, receives $y_{u-1,\ st1}$, $y_{u-1,\ st2}$, and $y_{u-1,\ st3}$ and outputs $$h_u^{dec,st3}.$$

The integration weights at the joint network 213 are different for the different inputs (st1, st2, st3). This is because the model is trained to associate each utterance's dialect with its underlying linguistic content of the input sub-task while at the same time not over-fitting to any particular dialect.

The encoder network 212 receives $x_t$ and outputs $$h_u^{enc}.$$

The joint network 213 receives $$h_u^{dec,st1},\ h_u^{dec,st2},\ h_u^{dec,st3}, \text{ and } h_u^{enc}$$

and outputs $z_{t,u}$.

The softmax layer 214 receives $z_{t,u}$ and outputs P(y|t,u).

The RNN-T is a framework that trains an entire network simultaneously by jointly combining an output signal generated from a prediction network which mainly plays a role of language processing and that from an encoder network which mainly plays a role of acoustic processing. For example, when hard-switching is used to select between the outputs of each prediction network, the entire network is trained to enhance only a particular property associating between the current input speech and the corresponding sub-task. If the current input speech belongs to the sub-task1, the entire network leans a relationship between the input speech and sub-task1 only, where hard-switching means the case that the weight for the main prediction networks is fixed to 1 and the weighs for other prediction networks are fixed to 0. This may lead to the over-fitting to the particular sub-task. Therefore, our proposed method aims to enhance the connection between the input speech and the particular sub-task and at the same time avoid the over-fitting to the particular sub-task by giving a larger integration weight for the output signal from the main prediction network in which the input speech belongs to, and giving smaller weights for output signals from other prediction networks, and combining them at a joint layer.

Figure 4:
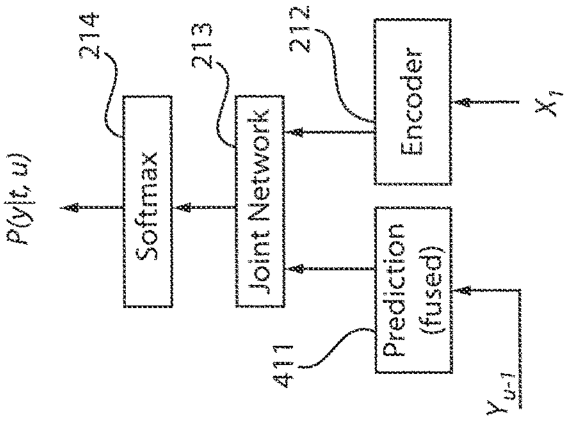
FIG. 4 is a block diagram showing exemplary fused prediction networks, in accordance with an embodiment of the present invention.

FIG. 4 is a block diagram showing exemplary fused prediction networks 411, in accordance with an embodiment of the present invention.

The prediction networks 211A, 211B, and 211C have been (sub-task) fused into prediction network 411. The prediction network receives $y_{u-1}$ and outputs $$h_u^{dec,fused}.$$

Figure 5:
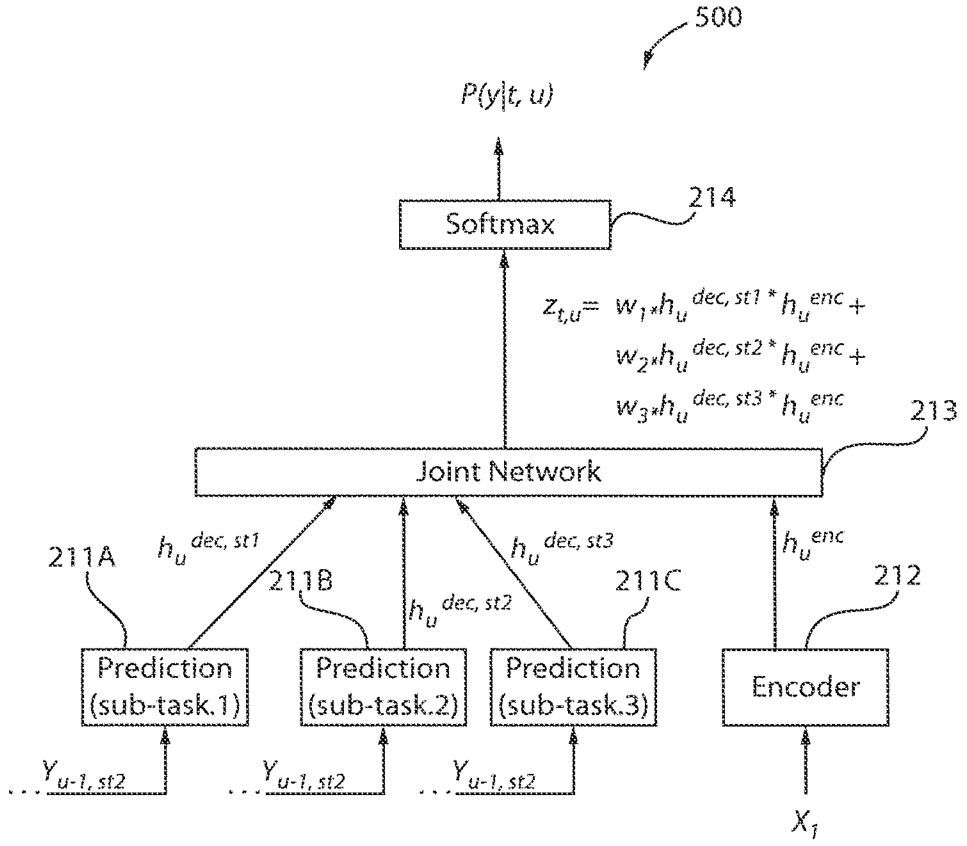
FIG. 5 is a block diagram showing an exemplary network training subsequent to prediction network expansion, in accordance with an embodiment of the present invention.

FIG. 5 is a block diagram showing an exemplary network training 500 subsequent to prediction network expansion 300, in accordance with an embodiment of the present invention.

The prediction network 211A, corresponding to a sub-task 1, receives $y_{u-1,\ st1}$, $y_{u-1,\ st2}$, and $y_{u-1,\ st3}$ and outputs $$h_u^{dec,st1}.$$

The prediction network 211B, corresponding to a sub-task 2, receives $y_{u-1,\ st1}$, $y_{u-1,\ st2}$, and $y_{u-1,\ st3}$ and outputs $$h_u^{dec,st2}.$$

The prediction network 211C, corresponding to a sub-task 3, receives $y_{u-1,\ st1}$, $y_{u-1,\ st2}$, and $y_{u-1,\ st3}$ and outputs $$h_u^{dec,st3}.$$

The integration weights at the joint network 213 are different for the different inputs (st1, st2, st3).

The encoder network 212 receives $x_t$ and outputs $$h_u^{enc}.$$

The joint network 213 receives $$h_u^{dec,st1},\ h_u^{dec,st2},\ h_u^{dec,st3},\text{ and }h_u^{enc}$$

and output $z_{t,u}$. In an embodiment, $$z_{t,u} = w_1 * h_u^{dec,st1} * h_u^{enc} + w_2 * h_u^{dec,st2} * h_u^{enc} + w_3 * h_u^{dec,st3} * h_u^{enc}.$$

The softmax layer 214 receives $z_{t,u}$ and outputs P(y|t,u).

The proposed approach changes integration weights at a joint layer depending on the input sub-task. A larger weight is used for the main branch matched to the input sub-task. It is to be appreciated that random initialization of prediction-net branches (not copying from the base branch) is not good for branch fusion.

This topology learns the relationship between each recognition task (contents of utterances) and its corresponding dialect including a speaking style which primarily or frequently occurs in the task.

Figure 6:
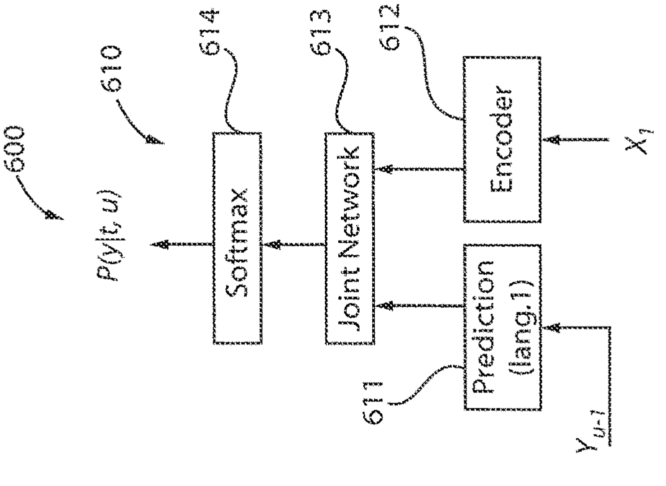
FIG. 6 is a block diagram showing another exemplary entire network initialization, in accordance with an embodiment of the present invention.

FIG. 6 is a block diagram showing another exemplary entire network initialization 600, in accordance with an embodiment of the present invention.

The network initialization 600 involves a network 610. The network 610 includes a prediction network 611, an encoder network 612, a joint network 613, and a softmax block 614. The network 610 is pretrained with a single-dialect network or a random initialization.

The prediction network 611, corresponding to a language 1, receives $y_{u-1}$ and outputs $$h_u^{dec}.$$

The encoder network 612 receives $x_t$ and outputs $$h_u^{enc}.$$

The joint network 613 receives $$h_u^{dec}\text{ and }h_u^{enc}$$

and outputs $z_{t,u}$.

The softmax layer 614 receives $z_{t,u}$ and outputs P(y|t,u).

Figure 7:
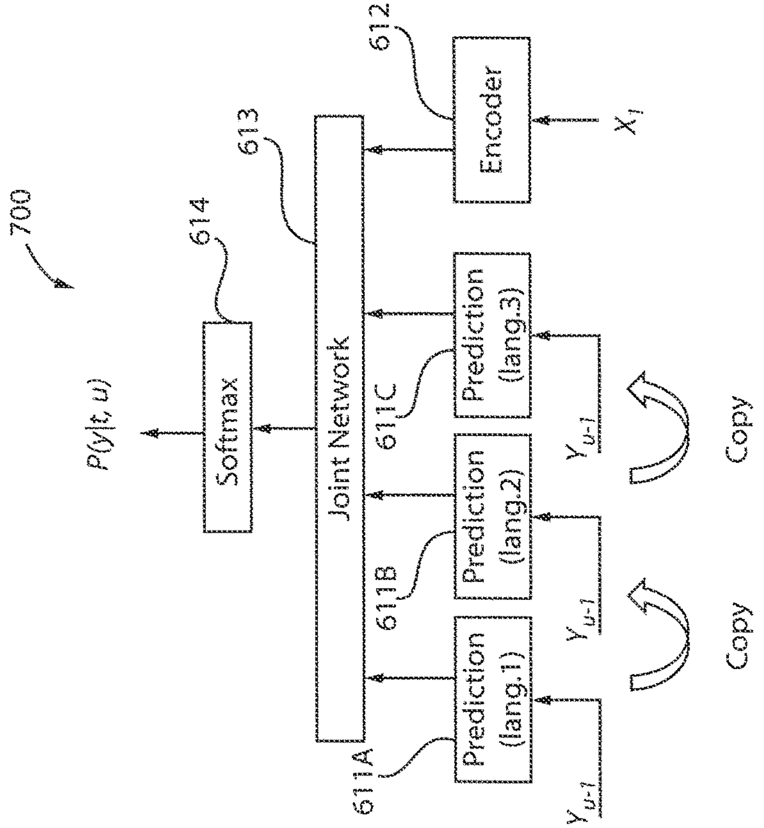
FIG. 7 is a block diagram showing another exemplary prediction network expansion, in accordance with an embodiment of the present invention.

FIG. 7 is a block diagram showing another exemplary prediction network expansion 700, in accordance with an embodiment of the present invention.

The prediction network 611 is expanded to include prediction networks 611A, 611B, and 611C to provide an expanded network 610.

While prediction network 611 in FIG. 7 is directed to language 1, prediction network 611A is now directed to language 1, with prediction network 611B directed to language 2, and with prediction network 611C directed to language 3. The additional prediction networks can be provided using a copying approach from the prediction network 611 directed to language 1.

An entirety of the expanded network 610 is then trained.

The prediction network 611A, corresponding to a language 1 (US), receives $y_{u-1,\ US}$, $y_{u-1,\ AU}$, and $y_{u-1,\ UK}$ and outputs $$h_u^{dec,US}.$$

The prediction network 611B, corresponding to a language 2 (AU), receives $y_{u-1,\ US}$, $y_{u-1,\ AU}$, and $y_{u-1,\ UK}$ and outputs $$h_u^{dec,AU}.$$

The prediction network 611C, corresponding to a language 3 (UK), receives $y_{u-1,\ US}$, $y_{u-1,\ AU}$, and $y_{u-1,\ UK}$ and outputs $$h_u^{dec,UK}.$$

The encoder network 612 receives $x_t$ and outputs $$h_u^{enc}.$$

The integration weights at the joint network 613 are different for the different inputs (US, AU, UK).

The joint network 613 receives $$h_u^{dec,US},\ h_u^{dec,AU},\ h_u^{dec,UK},\text{ and }h_u^{enc}$$

and outputs $z_{t,u}$.

The softmax layer 614 receives $z_{t,u}$ and outputs P(y|t,u).

Figure 8:
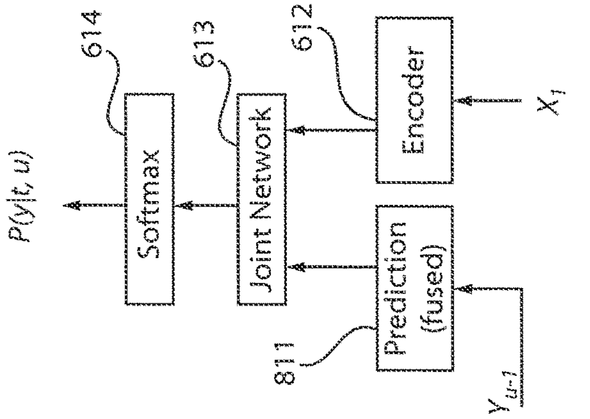
FIG. 8 is a block diagram showing exemplary fused prediction networks, in accordance with an embodiment of the present invention.

FIG. 8 is a block diagram showing exemplary fused prediction networks 811, in accordance with an embodiment of the present invention.

The prediction networks 611A, 611B, and 611C have been (language) fused into prediction network 811. The prediction network receives $y_{u-1}$ and outputs $$h_u^{dec,fused}.$$

Figure 9:
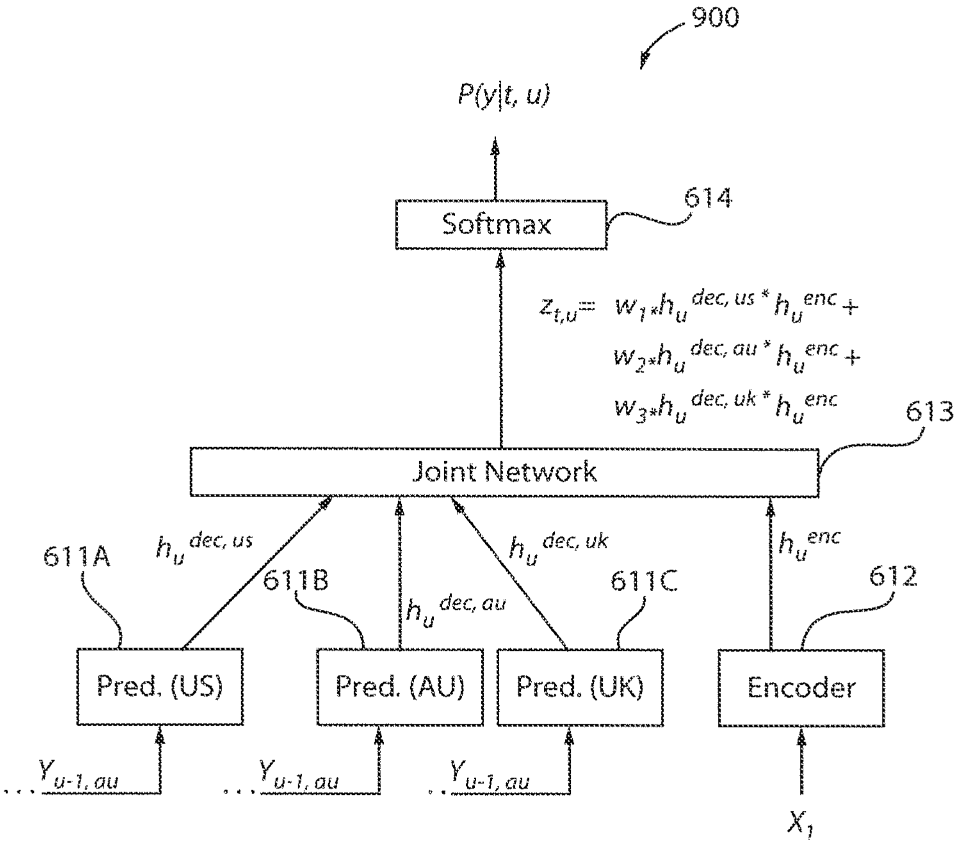
FIG. 9 is a block diagram showing an exemplary network training subsequent to prediction network expansion, in accordance with an embodiment of the present invention.

FIG. 9 is a block diagram showing an exemplary network training 900 subsequent to prediction network expansion 700, in accordance with an embodiment of the present invention.

The prediction network 611A, corresponding to a language 1 (US), receives $y_{u-1,\ AU}$ and outputs $$h_u^{dec,US}.$$

The prediction network 611B, corresponding to a language 2 (AU), receives $y_{u-1,\ AU}$ and outputs $$h_u^{dec,AU}.$$

The prediction network 611C, corresponding to a language 3 (UK), receives $y_{u-1,\ AU}$ and outputs $$h_u^{dec,UK}$$

when the input dialect is AU.

The encoder network 612 receives $x_t$ and outputs $$h_u^{enc}.$$

The joint network 613 receives $$h_u^{dec,US},\ h_u^{dec,AU},\ h_u^{dec,UK},\text{ and }h_u^{enc}$$

and outputs $z_{t,u}$. In an embodiment, $$z_{t,u} = w_1 * h_u^{dec,st1} * h_u^{enc} + w_2 * h_u^{dec,st2} * h_u^{enc} + w_3 * h_u^{dec,st3} * h_u^{enc}.$$

The softmax layer 214 receives $z_{t,u}$ and outputs P(y|t,u).

The proposed approach changes integration weights at a joint layer depending on the input sub-task. A larger weight is used for the main branch matched to the input sub-task. It is to be appreciated that random initialization of prediction-net branches (not copying from the base branch) is not good for branch fusion.

This topology learns the relationship between each recognition task (contents of utterances) and its corresponding dialect including a speaking style which primarily or frequently occurs in the task.

Figure 10:
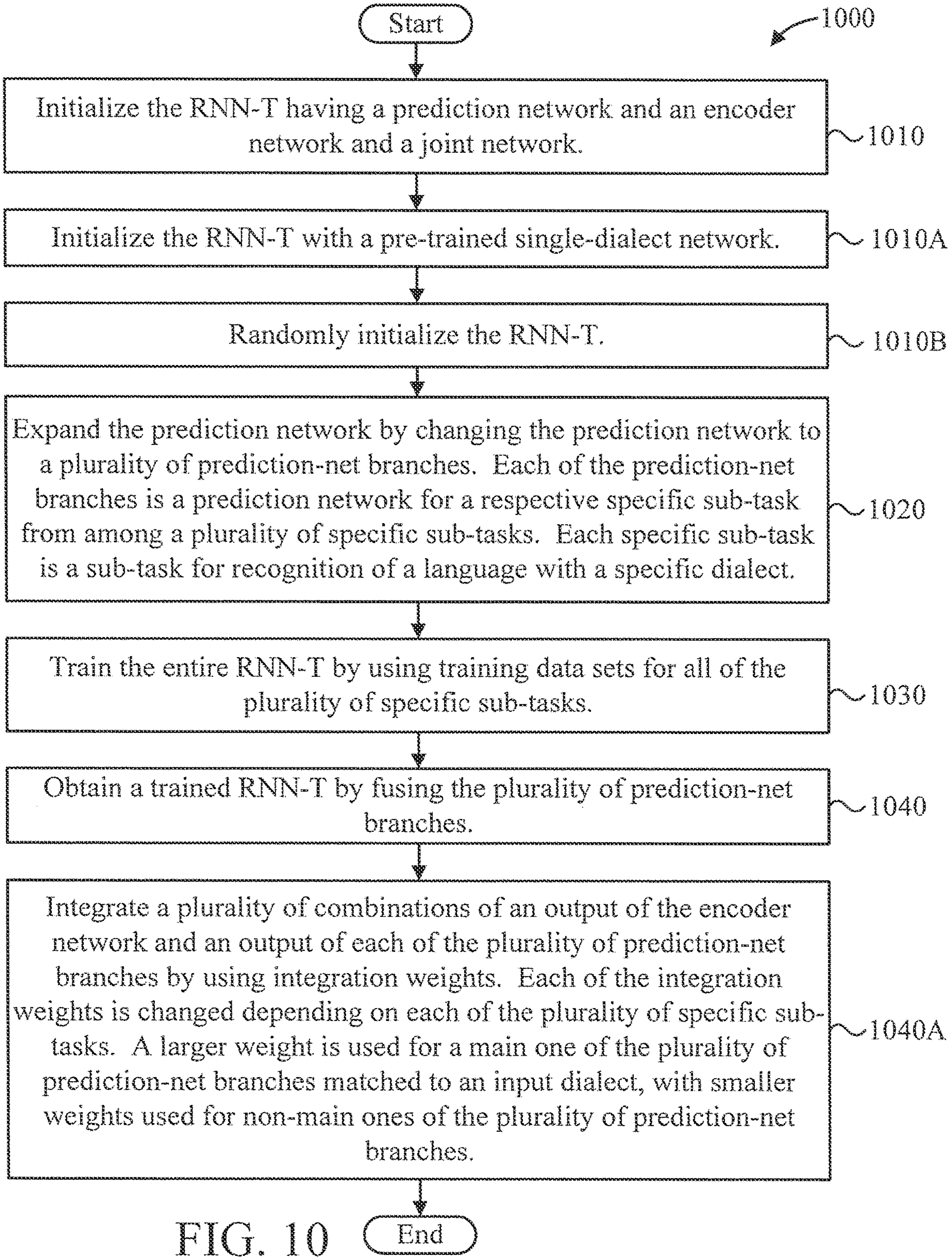
FIG. 10 is a flow diagram showing an exemplary method for training a recurrent neural network transducer (RNN-T) for speech recognition, in accordance with an embodiment of the present invention.

FIG. 10 is a flow diagram showing an exemplary method 1000 for training a recurrent neural network transducer (RNN-T) for speech recognition, in accordance with an embodiment of the present invention.

At block 1010, initialize the RNN-T having a prediction network and an encoder network and a joint network.

In an embodiment, block 1010 can include one or more of blocks 1010A and 1010B.

At block 1010A, initialize the RNN-T with a pre-trained single-dialect network.

At block 1010B, randomly initialize the RNN-T.

At block 1020, expand the prediction network by changing the prediction network to a plurality of prediction-net branches. Each of the prediction-net branches is a prediction network for a respective specific sub-task from among a plurality of specific sub-tasks. Each specific sub-task is a sub-task for recognition of a language with a specific dialect.

At block 1030, train the entire RNN-T by using training data sets for all of the plurality of specific sub-tasks.

At block 1040, obtain a trained RNN-T by fusing the plurality of prediction-net branches.

In an embodiment, block 1040 can include block 1040A.

At block 1040A, integrate a plurality of combinations of an output of the encoder network and an output of each of the plurality of prediction-net branches by using integration weights. Each of the integration weights is changed depending on each of the plurality of specific sub-tasks. A larger weight is used for a main one of the plurality of prediction-net branches matched to an input dialect, with smaller weights used for non-main ones of the plurality of prediction-net branches.

A description will now be given regarding fusing prediction branches, in accordance with an embodiment of the present invention.

In an embodiment, prediction networks have the same topology. Therefore, a simple weighted interpolation can be applied to the fusion of prediction networks after the training of block 1030 as follows:

$$W^{Pred} = \sum_{n}^{N} \gamma_n W_n^{Pred}$$

where $\gamma_n$ is an interpolation weight for the n-th prediction-net branch, $$W_n^{Pred}$$

is a network parameter of a n-th prediction-net branch, n is a prediction-net branch, and N is the number of prediction networks (branches).

Interpolation weights $\gamma_n$ that show the best Word Error Rates (WERs) in a development set are chosen for the final model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a neural transducer for speech recognition, the computer-implemented method comprising:

initializing the neural transducer having a prediction network, an encoder network, and a joint network;

expanding the prediction network by changing the prediction network to a plurality of prediction-net branches by copying weights from the prediction network to the plurality of prediction-net branches, wherein each of the plurality of prediction-net branches is a respective prediction network of a plurality of prediction networks comprising the prediction network, the plurality of prediction-net branches includes a first prediction-net branch and a second prediction-net branch, the first prediction-net branch is associated with a first sub-task, of a plurality of sub-tasks, of recognizing a first dialect of a language, and the second prediction-net branch is associated with a second sub-task, of the plurality of sub-tasks, of recognizing a second dialect of the language;

training, by a hardware processor, an entirety of the neural transducer by using training data sets for the plurality of sub-tasks; and fusing the plurality of prediction-net branches to obtain a trained neural transducer, wherein the fusing includes integrating a plurality of combinations of an output of the encoder network and an output of each of the plurality of prediction-net branches by using integration weights, each of the integration weights changes based on a respective sub-task of the plurality of sub-tasks, the integrating of the plurality of combinations includes summing a first product of a first integration weight of the integration weights, an output of the first prediction-net branch of the plurality of prediction-net branches, and the output of the encoder network, with a second product of a second integration weight of the integration weights, an output of the second prediction-net branch of the plurality of prediction-net branches, and the output of the encoder network, the output of each of the plurality of prediction-net branches is generated based on an input dialect, the first integration weight, which is larger than the second integration weight, is used for the first prediction-net branch matched to the input dialect that is corresponding to the first dialect, and the second integration weight is used for the second prediction-net branch unmatched to the input dialect.

2. The computer-implemented method of claim 1, wherein the integrating is performed by the joint network.

3. The computer-implemented method of claim 1, wherein the neural transducer is initialized with a pre-trained single-dialect network as the prediction network.

4. The computer-implemented method of claim 1, wherein the neural transducer is randomly initialized.

5. The computer-implemented method of claim 1, further comprising applying a softmax operation to an output of the joint network to obtain a softmax output for the neural transducer.

6. The computer-implemented method of claim 1, further comprising performing a speech recognition session using the trained neural transducer to recognize a user utterance.

7. The computer-implemented method of claim 1, wherein the neural transducer is a recurrent neural network transducer (RNN-T).

8. A computer program product for training a neural transducer for speech recognition, the computer program product comprising a non-transitory computer readable storage medium having program instructions embodied therewith, the program instructions executable by a computer to cause the computer to perform a method comprising:

initializing, by a hardware processor, the neural transducer having a prediction network, an encoder network, and a joint network;

expanding, by the hardware processor, the prediction network by changing the prediction network to a plurality of prediction-net branches by copying weights from the prediction network to the plurality of prediction-net branches, wherein each of the plurality of prediction-net branches is a respective prediction network of a plurality of prediction networks comprising the prediction network, the plurality of prediction-net branches includes a first prediction-net branch and a second prediction-net branch, the first prediction-net branch is associated with a first sub-task, of a plurality of sub-tasks, of recognizing a first dialect of a language, and the second prediction-net branch is associated with a second sub-task, of the plurality of sub-tasks, of recognizing a second dialect of the language;

training, by the hardware processor, an entirety of the neural transducer by using training data sets for the plurality of sub-tasks; and fusing, by the hardware processor, the plurality of prediction-net branches to obtain a trained neural transducer, wherein the fusing includes integrating a plurality of combinations of an output of the encoder network and an output of each of the plurality of prediction-net branches by using integration weights, each of the integration weights changes based on a respective sub-task of the plurality of sub-tasks, the integrating of the plurality of combinations includes summing a first product of a first integration weight of the integration weights, an output of the first prediction-net branch of the plurality of prediction-net branches, and the output of the encoder network, with a second product of a second integration weight of the integration weights, an output of the second prediction-net branch of the plurality of prediction-net branches, and the output of the encoder network, the output of each of the plurality of prediction-net branches is generated based on an input dialect, the first integration weight, which is larger than the second integration weight, is used for the first prediction-net branch matched to the input dialect that is corresponding to the first dialect, and the second integration weight is used for the second prediction-net branch unmatched to the input dialect.

9. The computer program product of claim 8, wherein the integrating is performed by the joint network.

10. The computer program product of claim 8, wherein the neural transducer is initialized with a pre-trained single-dialect network as the prediction network.

11. The computer program product of claim 8, wherein the neural transducer is randomly initialized.

12. The computer program product of claim 8, further comprising applying a softmax operation to an output of the joint network to obtain a softmax output for the neural transducer.

13. A computer processing system for training a neural transducer for speech recognition, the computer processing system comprising:

a memory device for storing program code; and a hardware processor operatively coupled to the memory device for running the program code to:

initialize the neural transducer having a prediction network, an encoder network, and a joint network;

expand the prediction network by changing the prediction network to a plurality of prediction-net branches by copying weights from the prediction network to the plurality of prediction-net branches, wherein each of the plurality of prediction-net branches is a respective prediction network of a plurality of prediction networks comprising the prediction network, the plurality of prediction-net branches includes a first prediction-net branch and a second prediction-net branch, the first prediction-net branch is associated with a first sub-task, of a plurality of sub-tasks, of recognizing a first dialect of a language, the second prediction-net branch is associated with a second sub-task, of the plurality of sub-tasks, of recognizing a second dialect of the language;

train an entirety of the neural transducer by using training data sets for-all of the plurality of sub-tasks; and fuse the plurality of prediction-net branches to obtain a trained neural transducer, wherein the fusion of the plurality of prediction-net branches includes integration of a plurality of combinations of an output of the encoder network and an output of each of the plurality of prediction-net branches by using integration weights, each of the integration weights changes based on a respective sub-task of the plurality of sub-tasks, the integration of the plurality of combinations includes summation of a first product of a first integration weight of the integration weights, an output of the first prediction-net branch of the plurality of prediction-net branches, and the output of the encoder network, with a second product of a second integration weight of the integration weights, an output of the second prediction-net branch of the plurality of prediction-net branches, and the output of the encoder network, the output of each of the plurality of prediction-net branches is generated based on an input dialect, the first integration weight, which is larger than the second integration weight, is used for the first prediction-net branch matched to the input dialect that is corresponding to the first dialect, and the second integration weight is used for the second prediction-net branch unmatched to the input dialect.

* * * * *